June 2, 1964  A. L. GODIER  3,135,901
SENSITIVE LOW FREQUENCY SERVO SYSTEM
Filed Jan. 8, 1962  2 Sheets-Sheet 1
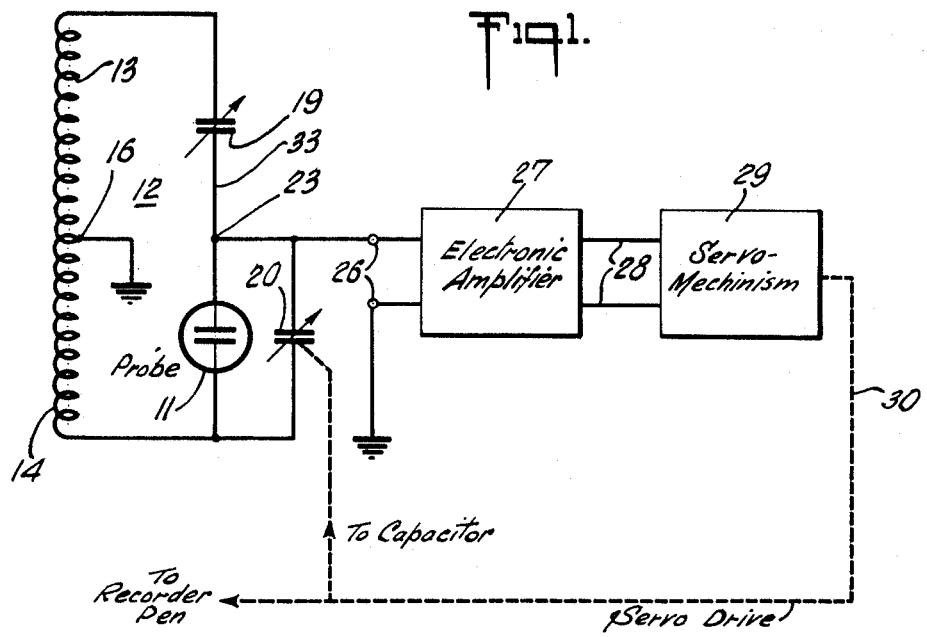

3,135,901
SENSITIVE LOW FREQUENCY SERVO SYSTEM
Alec L. Godier, Pointe-a-Pierre, Trinidad, West Indies, assignor to Texaco Trinidad, Inc., Pointe-a-Pierre, Trinidad, West Indies, a corporation of Delaware
Filed Jan. 8, 1962, Ser. No. 164,708
Claims priority, application Trinidad, West Indies
Nov. 16, 1961
3 Claims. (Cl. 318—29)

This invention is concerned with an electric servo system generally. More specifically, the invention applies to an improved high sensitivity, low frequency capacitance bridge type of servo system.

Heretofore where capacitance bridge servo systems have been employed, particularly where the variable capacitance element that is varied by a condition to be recorded or controlled, has necessitated the use of high frequency equipment in order to render the relatively low capacitance of a condition responsive element effective to gain adequate sensitivity. Such high frequency equipment involves relatively complex and expensive elements, and furthermore is subject to breakdown and unreliable operation on this account.

Consequently it is an object of this invention to provide a capacitance bridge type of electric servo system that is adapted for low frequency operation and that has superior sensitivity.

Another object of the invention is to provide an electric servo system of the capacitance bridge type which has improved sensitivity and stability for low frequency applications, while at the same time employing a minimum number of operating elements. Thus the servo system in accordance with this invention provides superior simplicity and reliability along with the heretofore unrealizable sensitivity and stability.

Still another object of the invention is to provide an improved capacitance bridge type electric servo system that employs a vacuum tube impedance matching amplifier with a direct connected plate supply for the tubes that is directly related to the bridge circuit elements employed.

The foregoing and other objects and benefits of the invention will be more fully appreciated in connection with a more detailed description of a preferred embodiment that is set forth below and that is illustrated in the drawings: in which, FIGURE 1 is a schematic system diagram showing the elements of a complete servo system in accordance with the invention;

FIGURE 2 is a circuit diagram illustrating the details of an improved amplifier circuit with its relation to the capacitance bridge of the system;

Figure 3:
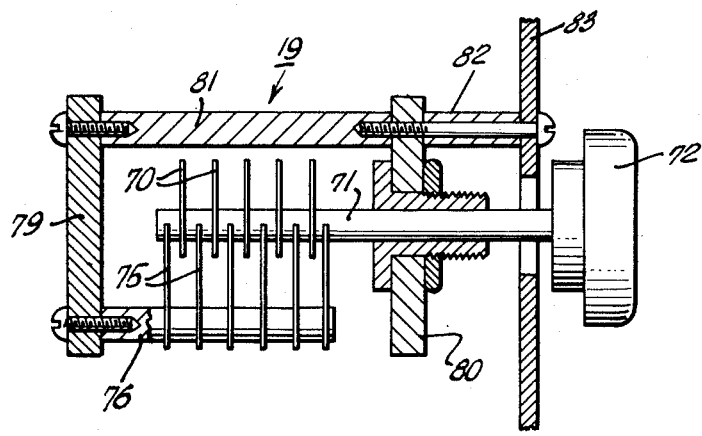
FIGURE 3 is an elevation partly in cross section showing the structure for a variable capacitor that is employed in one arm of the capacitance bridge.

Referring to FIGURE 1 it is pointed out that an electric servo system according to the invention is particularly adapted for use in a recorder for automatically determining a condition, e.g. the dielectric constant of a flowing refinery stream of dry hydrocarbons. In such use the servo system that is employed in the recording system is one according to this invention, where an improved sensitivity and reliability is obtained while employing a low frequency capacitance bridge type servo system. The system when used as indicated, i.e. for determining dielectric constant of a flowing refinery stream, employs a capacitance type probe 11 that has the stream of dry hydrocarbon materials passing through the probe so as to determine the dielectric constant and thus the capacitance of the probe 11. In order to make a reading, or record, of the dielectric constant that is thus measured, there is employed a servo system that is of a type that is broadly old and well known. This includes a capacitance bridge circuit 12 that has as two arms of the bridge, two halves 13 and 14 of a transformer secondary winding. In order to connect these two halves as two legs of the bridge 12, there is a center tap connection 16 that is grounded as shown. The other two legs of the bridge 12 include an adjustable capacitor 19, plus the probe 11 with a variable trimmer capacitor 20 connected in parallel therewith.

The output of the bridge 12 is connected from one diagonal point 23, while the other side goes to the opposite diagonal point, i.e. the center tap connection 16 which is connected to a grounded circuit. The output signals from bridge 12 are thus connected from the diagonals to a pair of input terminals 26 of an electronic amplifier 27 that in turn has an output which is fed via a pair of connectors 28 to the input of a servo motor or mechanism 29. The servo system is completed by a mechanical connection 30 from the servo mechanism or motor 29 to the trimmer capacitor 20, while at the same time there may be a connection to a recorder pen or the like for making a record of the adjustments as the bridge 12 is maintained in balance. This is broadly a well known so-called null balance type of servo system.

In the illustrated use of the invention, the condition responsive probe 11 will have the capacitance changed in one direction or the other whenever the aromatic content of the dry hydrocarbon material changes and the bridge 12 consequently will be unbalanced to produce an output signal of one phase or the opposite phase. The rest of the system is arranged so that the servo mechanism or motor 29 will be energized to drive in one direction or the other, depending upon the phase of the output signals from the bridge 12. The mechanical connection 30 that leads back to the trimmer condenser 20, is arranged so as to adjust the trimmer capacitor in a direction that will tend to reduce the output signal from the bridge toward zero, i.e. until it is once more balanced and the output is zero. Thus whichever way the condition changes insofar as the capacitance of probe 11 is concerned, the trimmer condenser is adjusted in the proper direction for tending to cancel out or remove the capacitance change and rebalance the bridge once more. It will be appreciated that as these changes take place, the recorder pen (or other indicator—not shown) will be adjusted along with the trimmer capacitor 20 and its indications may be readily calibrated to provide a record of the condition, e.g. aromatic content that is causing the changes in dielectric constant of the probe 11.

Referring to FIGURE 2 it will be observed that the elements involved in the servo system according to the invention are a minimum in number and the circuit arrangement is relatively simple. Furthermore it is pointed out that the system is especially applicable to an arrangement where a low frequency power supply source is all that is required for the operation of the system. Thus the elements of amplifier 27 and their relationship to the bridge circuit 12, as well as the connection with an electric power source, are all illustrated in the FIGURE 2 circuit diagram.

The elements of the bridge 12 are connected in a compact and simple manner for feeding a vacuum tube amplifier which has only two stages and which is adapted to be able to match the very high impedance output of the capacitance bridge 12 with a relatively low impedance input circuit for a low frequency servo mechanism. In the illustration of the circuit to carry this out, it will be observed that the same elements are connected to make the bridge arrangement as is shown in FIGURE 1, although the circuit of FIGURE 2 has these elements physically rearranged.

With reference to FIGURE 2 in more detail, the winding 13 has one end connected to a ground circuit wire 34 via the center tap connection 16 and a connector 35. The other (free) end of winding 13 is connected to one side of the variable capacitor 19 while a connection 33 from the other side of the capacitor, leads to the opposite diagonal point 23. Diagonal point 23 is also connected directly to one side, or electrode, of the probe 11, while the other side (electrode) of the probe is connected to the free end of the other half transformer winding 14. The adjustable trimmer capacitor 20 is connected in parallel with probe 11.

One side of the output of the bridge is connected from the diagonal point 23 via a resistor 36 to the grid of a triode vacuum tube 37. The other side is taken from the opposite diagonal point 16 via wire 35 to the grounded circuit that leads via the wire 34 in turn to the grounded side of the input to tube 37. It will be observed that tube 37 has its cathode connected to the ground circuit via a series connected cathode resistor 40.

In the foregoing manner, tube 37 which is connected as a cathode follower, provides a high impedance for matching the impedance of the bridge circuit. The output signals from tube 37 are transferred from the cathode side of the tube via a capacitor 41 that is connected to the grid, or input of another vacuum tube 42. Vacuum tube 42 has an output circuit connected in the plate circuit thereof. This output circuit includes a capacitor 45 that is connected to the plate of tube 42, while the other side is connected to the power supply for the plate circuits of both tubes 37 and 42. Such plate supply is connected to the other end of a plate resistor 46 in the circuit for tube 42. Thus the output may be taken off at a pair of output terminals 48 and 49.

It will be appreciated that the servo mechanism, or motor, 29 may take many different forms. A preferred arrangement is one having a phase sensitive galvanometer (not shown) connected to the output terminals 48 and 49 with respect to one winding thereof, while the other winding is connected across the power supply source of low frequency current that is being employed, e.g. power source 50 indicated. In this way the galvanometer will be deflected one direction or the other depending upon the phase of the output signals that are applied via terminals 48 and 49, and the galvanometer deflections will actuate a switch (not shown) that is periodically closed to energize a directional motor arrangement that has a mechanical connection for positioning the recording pen or the like, while at the same time positioning the adjustable trimmer capacitor 20 and thus reducing the output signals from the bridge toward zero. Such a servo mechanism has been employed and it involved the adaptation of an old style commercial servo mechanism that was manufactured by the Leeds and Northrup Company of Philadelphia, Pennsylvania which carried a designation of Model S, 40,000 series Micromax. The adaptation merely concerned replacing the permanent field magnet of the galvanometer by an alternating current magnet which was connected to the power source 50, while the moving coil of the galvanometer was connected to the output terminals 48 and 49 as previously indicated.

It will be appreciated by anyone skilled in the art that a similar arrangement might be employed where the servo motor or mechanism 29 could be a two phase A.C. motor that is energized for one direction of rotation or the other, depending upon the phase of the output signal applied to one winding thereof which would be connected to output terminals 48 and 49. Otherwise, the relationship to the system would be the same so that the two phase motor would position the recording pen and simultaneously make adjustment of the trimmer capacitor 20. Of course, other arrangements or equivalent rebalance motor structures could be employed as well.

Referring once more to FIGURE 2, it is pointed out that the arrangement so far described is energized by means of a transformer 52 that has a primary or input winding 53 connected across the low frequency power supply 50, e.g. normal sixty cycle power that is available at most refineries. The secondary winding of transformer 52 is divided into the two parts 13 and 14 as previously indicated, and has the center tap connection 16 which is connected to the grounded circuit wire or connection 34. Thus the windings 13 and 14 together are the secondary winding of transformer 52 and have a dual capacity, so that in addition to acting as legs of the bridge circuit 12 (FIGURE 1) this alternating current power source is applied as a source for the plate supply for vacuum tubes 37 and 42. The latter is done by means of employing a pair of rectifiers 57 and 58 that have one side, or electrode, of each connected respectively to the free ends of the transformer windings 13 and 14. The other electrode of both rectifiers 57 and 58 are connected in common via a circuit connection 61 to one end of a resistor 62 that has the other end thereof connected to a direct current plate supply line 63. The direct current potential thus created on plate supply line 63 is filtered by employing a pair of capacitors 66 and 67 that each have one electrode thereof connected to the ground circuit 34, while the other electrode leads to one end respectively of the resistor 62. This arrangement provides a standard full wave rectifier and filter circuit that will provide smooth direct current supply for the plates of tubes 37 and 42.

It will be noted that the circuit arrangement employed creates a compact and simple arrangement with a minimum of elements employed, while at the same time the sensitivity changes required is obtained by reason of the impedance matching connection with vacuum tube elements 37 and 42.

It has been discovered that with commercially available variable capacitors employed as the capacitance elements for bridge 12, a temperature and humidity drift effect that was undesired was found to exist. This apparently was due to the resistance effects of the structure involved in such capacitors, and consequently the applicant prefers to employ specially constructed variable capacitors in accordance with the illustrations of FIGURES 3 and 4.

The FIGURE 3 illustration shows the elements involved in the structure for adjustable capacitor 19. There are the usual rotor plates 70 mounted on a shaft 71 that may be rotated by an adjustment knob 72. The plates 70 act in the usual manner in a group by being rotated relative to a set of stator plates 75 that are mounted on one or more supporting rods 76. The remaining supporting structure for plates 70 and 75 includes ceramic material end plates 79 and 80 that are mounted parallel to each other by a plurality of brass spacers 81 and 82 attached as indicated for mounting on an aluminum panel 83. It is pointed out that the structure of this capacitor is merely improved so far as obtaining a very high resistance path across the plates of the capacitor and one that substantially does not vary with ambient changes in temperature or humidity.

Figure 4:
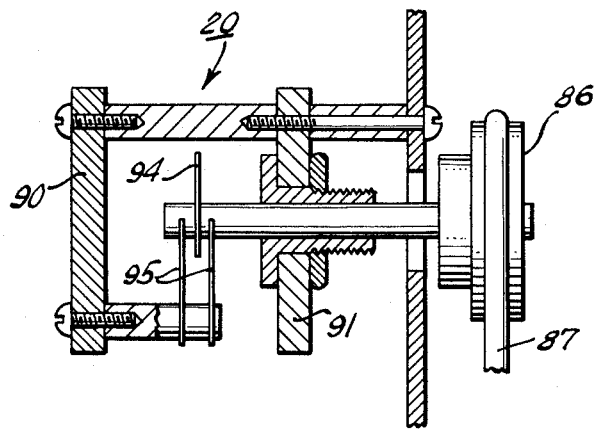
FIGURE 4 is an elevation partly in cross section illustrating the structure for a second variable capacitor that is employed as the rebalancing element in the capacitance bridge.

The FIGURE 4 illustration shows the trimmer capacitor 20 which is substantially the same in principle as capacitor 19, so that the elements need not be described in detail. However, it may be noted that the rotor capacitor 20 has a pulley 86 attached to its shaft with a belt 87 acting in conjunction with the pulley to provide the adjustment that is in accordance with the mechanical connection back to the servo mechanism as has been indicated above. It will be appreciated that capacitor 20 has ceramic end plates 90 and 91 to which stator and rotor capacitor plates 95 and 94 respectively, are connected.

While a particular embodiment of the invention has been described above in considerable detail in accordance with the applicable statutes, this is not to be taken as in any way limiting the invention but merely as being descriptive thereof.

I claim:

1. A highly sensitive stable low frequency electric servo system having a capacitance probe and comprising in combination an alternating current capacitance bridge circuit having very high output impedance, said bridge circuit comprising both halves of the secondary winding of a low voltage transformer and said probe plus a very high resistance temperature and humidity insensitive capacitor, an amplifier connected to the output of said bridge comprising solely a vacuum tube cathode follower input stage and a low impedance output stage, phase sensitive servo motor means connected to said amplifier output stage, and means driven by said motor means for rebalancing said bridge circuit.

2. The invention according to claim 1 wherein said bridge circuit also includes in the capacitance arm containing said probe an adjustable capacitor for varying the capacitance of that arm to rebalance the bridge, and wherein said rebalancing means include a connection from said motor means to said adjustable capacitor.

3. In an electric servo system comprising a capacitance bridge having a condition responsive means for varying the capacitance of a capacitance element in said bridge and a variable capacitance element for rebalancing said bridge, phase sensitive servo motor means connected to the output of said bridge, means driven by said motor means for varying said variable capacitance element and for indicating a characteristic of said condition, the improvement comprising an electronic amplifier including solely two stages of vacuum tube amplification, said first stage being a triode with the grid connected to one side of the output of said bridge the other side of the said output being connected to the cathode of said triode in series with a cathode resistor to provide a cathode follower, said second stage being a vacuum tube having a plate circuit output, the said vacuum tube stages having the plate supply voltage directly supplied from two halves of a transformer that are connected to form two arms of said capacitance bridge.

References Cited in the file of this patent

UNITED STATES PATENTS

| | | |
|---|---|---|
| 2,844,776 | Dimeff | July 22, 1958 |
| 2,891,208 | Hansburg et al. | June 16, 1959 |
| 2,962,641 | Maltby et al. | Nov. 29, 1960 |